L. M. EVANS AND G. W. STEINMANN.
FLASH LAMP.
APPLICATION FILED JUNE 16, 1920.
1,406,452.
Patented Feb. 14, 1922.
2 SHEETS—SHEET 1.
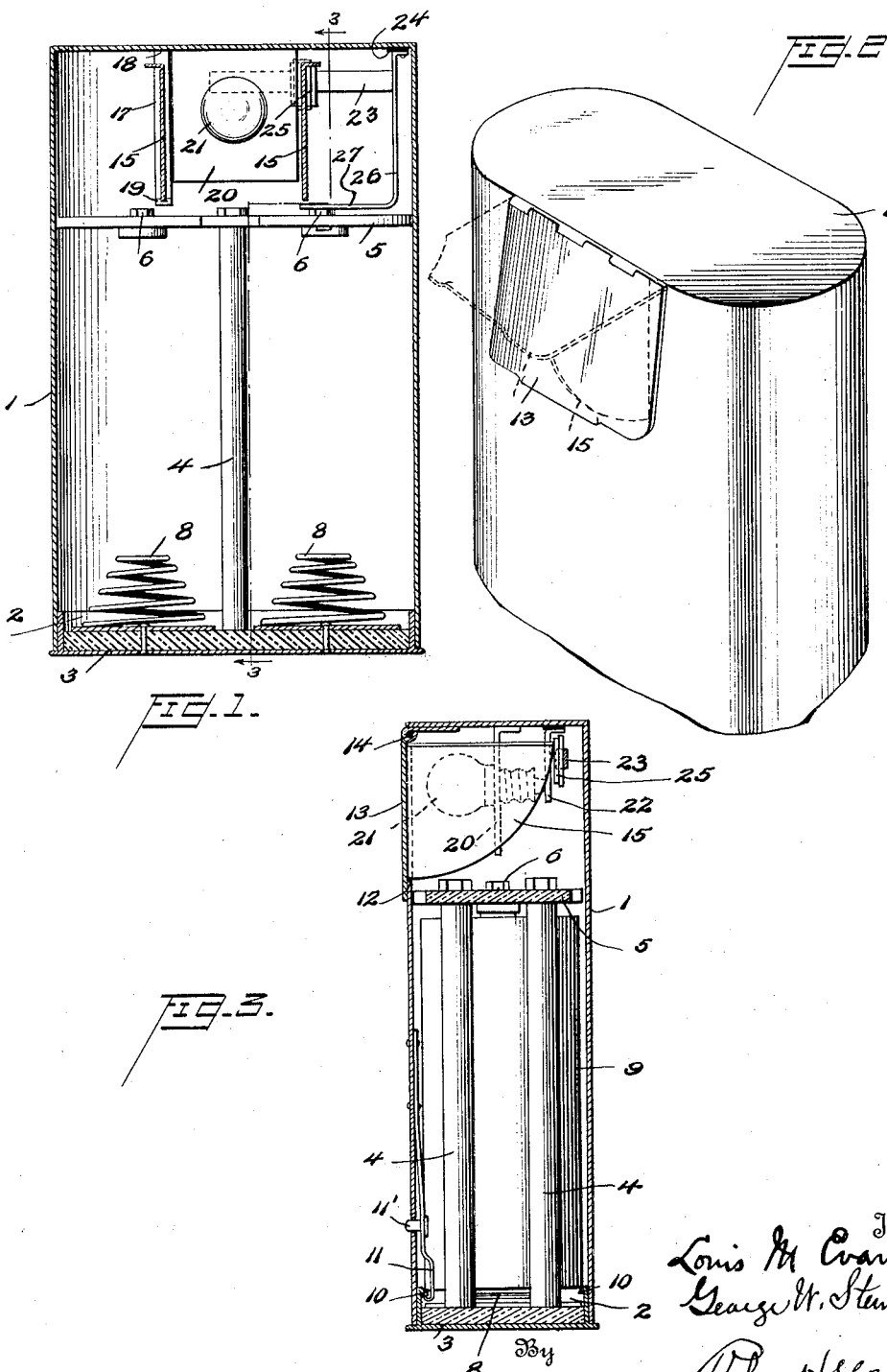

L. M. EVANS AND G. W. STEINMANN.
FLASH LAMP.
APPLICATION FILED JUNE 16, 1920.
1,406,452.
Patented Feb. 14, 1922.
2 SHEETS—SHEET 2.
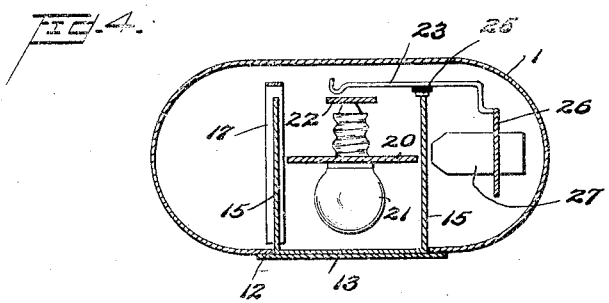
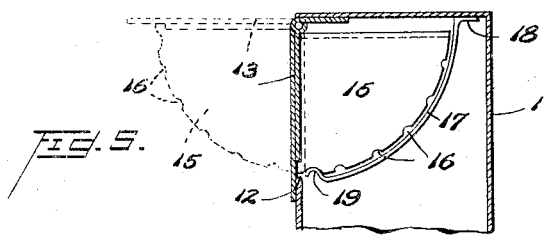
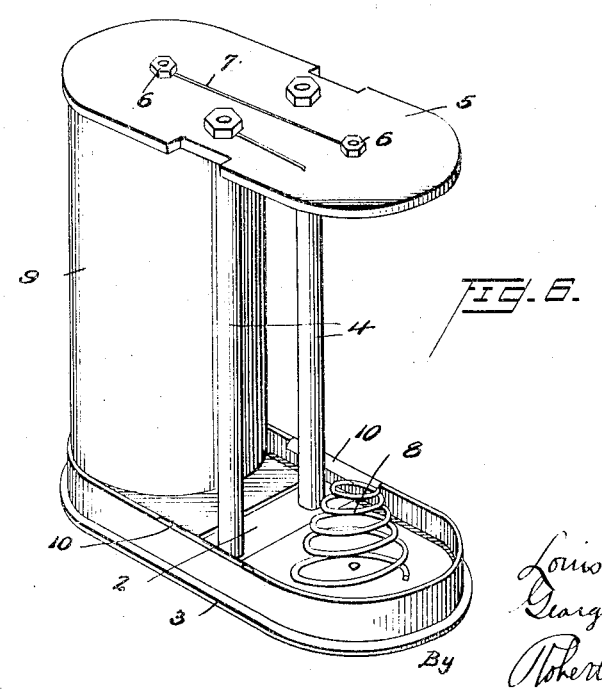
Inventor
Louis M. Evans
George W. Steinmann
By Robert H. Young
Attorney

UNITED STATES PATENT OFFICE.

LOUIS M. EVANS AND GEORGE W. STEINMANN, OF WASHINGTON, DISTRICT OF COLUMBIA.

FLASH LAMP.

1,406,452.   Specification of Letters Patent.   Patented Feb. 14, 1922.

Application filed June 16, 1920. Serial No. 389,456.

*To all whom it may concern:*

Be it known that we, LOUIS M. EVANS and GEORGE W. STEINMANN, citizens of the United States of America, residing, respectively, at Washington, in the District of Columbia, have invented a certain new and useful Improvement in Flash Lamps, of which the following is a specification.

This invention relates to improvements in electric flashlamps and it is the principal object of the invention to provide a portable self contained electric flashlamp having a novel form of circuit closing means therefor, whereby the incandescent lamp in the same may be energized at will by a user.

It is also an object of the invention to provide a novel form of shutter for the lamp which can be adjusted to limit and direct light rays emitted from the lamp onto a confined or restricted area or when desired, opened to its full position for furnishing its maximum of light, movement of said shutter from closed position to even a partially as well as full open position serving to close the illuminating circuit through the lamp.

Another object of the invention is to provide a novel form of circuit closing means for the lamp which is of exceedingly compact arrangement, and because of its simplicity of construction, offers a practical, positive, and durable device when reduced to general use.

Yet another object of the invention resides in the provision of an advantageous form of holder for the lamp batteries, whereby the same will be retained in such position as will insure proper contact thereof and hence, render the lamp instantly available for use at all times.

Other objects will be in part obvious and in part pointed out hereinafter.

In order that the invention and its mode of application may be readily understood by persons skilled in the art, we have, in the accompanying illustrative drawings, and in the detailed following description based thereon, set out a convenient and satisfactory embodiment of the same.

In these drawings:

Figure 1 is a longitudinal section through the improved lamp, the batteries being removed;

Figure 2 is a fragmentary perspective view of the housing thereof, the shutter being shown in full lines in partially open position and in dotted lines in full open position;

Figure 3 is a fragmentary detail in perspective of the incandescent lamp supporting means, spring catch and circuit closing means employed, the side walls of the housing being broken away;

Figure 4 is a transverse section through the lamp, the shutter in closed position and the circuit closing means in break position;

Figure 5 is a fragmentary detail in section showing the engagement of the spring catch with one side of the shutter; and, Figure 6 is a perspective view of the type of battery holder employed, but one battery being arranged therein.

Having more particular reference to the drawings, in connection with which like characters of reference will designate corresponding parts throughout the several views, the improved flashlamp comprises a casing 1 open at one end and adapted to receive through such open end, a battery holder indicated in its entirety by the numeral 2, said holder consisting of a base plate 3 corresponding in shape and size to the open end of the casing 1, having spaced uprights 4 formed of insulating material secured thereto, a contact plate, also of insulating material, indicated by the numeral 5 being secured to the upper ends of said posts 4 and carrying thereon spaced contacts 6 which, as will be noted, are interconnected by a suitable conductor 7. Helical springs 8 are arranged upon the base plate 3 and connected thereto, serving as means for engaging the lower ends of batteries 9 arranged in the holder and maintaining the negative and positive poles of such batteries in engagement with the contacts 6, the negative pole of one of these batteries being grounded through the adjacent helical spring 8 onto the metal base plate 3. The other helical spring is connected by a conductor passing through the upright 4 to one of the contacts 6 that the two batteries may be in series. Suitable lugs 10 are formed on the inner side of the marginal flange of the base plate 3 and are adapted to be engaged by a spring catch 11 secured to the inner side of the housing 1 adjacent its open end and carrying a finger piece 11' which is received through an opening in an adjacent portion of the housing, thus affording means for permitting disengagement of said catch from the particular lug 10 engaged thereby in order that the battery holder may be freely removed from the housing.

An opening 12 is arranged in one side wall of the housing 1 adjacent its closed end and, obviously, serves to permit projection of light rays from the lamp, hereinafter described, a shutter 13 being pivoted to said wall as at 14 and formed with segmental sides 15 having notches 16 in the marginal portion of one end thereof adapted to be engaged by a curved spring catch 17 secured at one end to the inner side of the end wall of the housing as at 18, while its free end is formed with a curved bearing member 19 normally adapted to ride over the notched marginal portion of said segmental side and to be engaged in the notches 16 whereby said shutter may be releasably held in an adjusted position, thus allowing the light rays projected from the lamp to be limited or restricted to a desired area. When the shutter 13 is in full open position, it is to be noted that the curved end 19 will engage behind the adjacent straight edge of the segmental side 15 and in consequence, will serve to releasably maintain said shutter in its full open position.

Secured to the inner side of the end wall of the housing 1 is a plate 20 having the usual screw threaded lamp socket therein for receiving an incandescent lamp 21, said plate being preferably formed with a reflecting surface. A contact plate 22 is also secured to the inner side of the end wall of the housing 1 and is engaged by one end of the incandescent lamp 21, while a spring contact arm 23 is secured to said end wall and insulated therefrom by the interpositioning of an insulating strip 24 between the same and its connection with such end wall, an insulated bearing plate 25 being carried on the intermediate portion of the spring arm and so disposed as to be engaged by the adjacent segmental side 15 of the shutter 13 when said shutter has been moved to a partially closed position. As the shutter is moved to a full closed position, it will be noted that the segmental side 15 will engage the bearing plate 25 in the arm 23 and in consequence, said arm will be flexed downwardly so that the outer or free end of the same will be disengaged from the contact plate 22, thus breaking circuit as between said arm 23 and contact spring 22. An inwardly extending spring contact 26 is carried by the contact arm 23 and has its free inner end extended at substantially right angles as at 27 whereby the same will be engaged with one of the positive poles of the intercoupled batteries 9 whereby, when the shutter is moved to open position, a complete circuit will be established through the incandescent lamp 21, it being borne in mind in this particular connection that the opposite side of the circuit is effected through the grounding of its negative side of the same through the end plate 3 and the housing 1.

It may be here noted that the positioning of the incandescent lamp 21 with relation to the opening 12 in the housing 1 is such as to permit the projection of light rays emitted by the incandescent lamp from the housing 1, the reflecting surface on the plate 20 serving, obviously, to multiply or at least intensify, such rays.

In using our improved flash-lamp and assuming that the same has been assembled in the manner hereinbefore outlined, to close circuit through the incandescent lamp 21 it is only necessary that the shutter 13 be swung upon its pivot for a distance sufficiently to disengage its segmental side 15 from the bearing plate 25 on the spring arm 23, such arm immediately returning into engagement with the contact plate 22 and thereby completing an electric circuit through the lamp 21. Of course, the shutter may be as readily moved to full open position when effecting connection between the spring contact arm 23 and the contact plate 22, permitting the lamp 21 to continue functioning. To break the circuit through the incandescent lamp 21, the shutter 13 is swung to a full closed position, at which time the segmental side 15 thereof will engage the bearing plate 25 on the spring contact arm 23 and flex the same downwardly to bring about disengagement of such arm with the contact plate 22. The spring catch 17 will serve as means for releasably maintaining the shutter 13 in an adjusted position, since the curved end 19 thereof will engage in the adjacent one of the notches 16 formed in the particular segmental side 15 provided therewith. By this arrangement, it will be appreciated that the lamp is especially advantageous for use in places where the projection of light rays therefrom onto a limited or restricted area is desired, such for example as in military operations, where it is the desire of the user of a light of any nature, to shield the same from the eyes of an enemy.

As hereinbefore set out, by reason of the novel type of combined circuit closing means and shutter provided my portable self contained electric flashlamp, we have produced a device which, because of its simplified and compact construction and arrangement, will be found durable, practical and positive in operation when subjected to even the roughest of use.

Manifestly, the construction shown is capable of considerable modification, and such modification as is within the scope of our claims, we consider within the spirit of our invention.

We claim:

A portable self-contained flash lamp, comprising a housing, a battery holder, snugly received in said holder and adapted to close one end of the same, said holder including spaced plates for receiving batteries there between and electrically interconnecting the same; spring means on the bottom plate for yieldedly engaging the adjacent ends of the batteries, an incandescent lamp supported in the battery portion of said housing adjacent an open form in one of its side walls, circuit closing means for controlling energization of said lamp and shutter pivoting to said housing for regulating the passage of light rays through the opening in the housing and adapted, at times, to direct such rays downwardly from the opening, said shutter co-operating with said circuit means to actuate the same upon its movement to an open or partly opened position.

LOUIS M. EVANS.
GEORGE W. STEINMANN.